(12) United States Patent
Cai et al.

(10) Patent No.: US 8,207,980 B2
(45) Date of Patent: Jun. 26, 2012

(54) COORDINATE COMPUTATIONS FOR NON-POWER OF 2 TEXTURE MAPS

(75) Inventors: Mike M. Cai, Newark, CA (US); Anthony Ya-Nai Tai, San Jose, CA (US); Jean-Didier Allegrucci, Sunnyvale, CA (US)

(73) Assignee: Vivante Corporation, Sunnyvale, CA (US)

( * ) Notice: Subject to any disclaimer, the term of this patent is extended or adjusted under 35 U.S.C. 154(b) by 935 days.

(21) Appl. No.: 11/799,711

(22) Filed: May 1, 2007

(65) Prior Publication Data

US 2008/0273043 A1    Nov. 6, 2008

(51) Int. Cl.
*G09G 5/00*    (2006.01)
(52) U.S. Cl. ......... 345/586; 345/582; 345/584; 345/643
(58) Field of Classification Search ........................ None
See application file for complete search history.

(56) References Cited

U.S. PATENT DOCUMENTS

| 6,330,000 B1 * | 12/2001 | Fenney et al. ................. 345/586 |
| 6,618,049 B1 * | 9/2003 | Hansen ......................... 345/423 |
| 7,355,604 B2 * | 4/2008 | Bando et al. .................. 345/582 |

* cited by examiner

*Primary Examiner* — Antonio A Caschera
(74) *Attorney, Agent, or Firm* — David R. Stevens; Steven Law Group (57) ABSTRACT

A graphic processing system to compute a texture coordinate. An embodiment of the graphic processing system includes a memory device, a texture coordinate generator, and a display device. The memory device is configured to store a plurality of texture maps. The texture coordinate generator is coupled to the memory device. The texture coordinate generator is configured to compute a final texture coordinate using an arithmetic operation exclusive of a division operation. The display device is coupled to the texture coordinate generator. The display device is configured to display a representation of one of the plurality of texture maps according to the final texture coordinate. Embodiments of the graphic processing system facilitate a simple hardware implementation using operations other than division.

13 Claims, 7 Drawing Sheets

COORDINATE COMPUTATIONS FOR NON-POWER OF 2 TEXTURE MAPS

BACKGROUND OF THE INVENTION

In video graphics applications, many techniques are used to render graphical images of different shapes and sizes. Typically, graphical images are made up of thousands, or even millions, of primitive shapes such as triangles. Each triangle is defined by the coordinates of its vertices. In order to enhance the three-dimensional aspects of a graphical rendering, texture may be added to each of the triangles or other drawing units. Texture coordinates are used to assign texture maps to each object as it is rendered on a display device. A texture map is an array of texture elements (texels) combined to form a standard block of texture.

Mapping textures to rendered objects can be complicated by the depths (i.e., distances relative to the viewer) of the various objects in a rendered scene. The orientation of the rendered objects can also affect the complexity of mapping the textures to the rendered objects. Furthermore, applying texture to a single object can be complicated if the object varies in depth and orientation on the display device.

In order to map a texture to an object, one or more texture maps may be arrayed across the surface area of the object. Different type of array patterns such as texture wrapping and texture mirror can be used. In each case, however, the coordinates for each texture map are calculated so that the several texture maps are rendered in the correct areas of the display.

Conventional techniques for implementing non-power of two texture coordinate wrapping and mirror patterns use a divider to divide a texture coordinate in texture space by a non-power of two texture map size to get the result. As an example, the following conventional equations are used:

$$U' = (\text{int}(S*\text{width}))\% \text{ width, and}$$

$$I = (\text{int}(S*\text{width}))/\text{width}$$

where S designates the floating-point texture coordinate, U' designates an intermediate texture coordinate, I designates a fixed point integer component, and width designates a dimension of a texture map. The computation of the intermediate texture coordinate, U', implements a remainder division operation (e.g., a modulo, or mod, operation), and the computation of the fixed point integer component, I, implements a quotient division operation.

For a texture coordinate wrapping pattern, the final texture coordinate, U, is calculated, according to the following:

$$U=U'$$

For a texture coordinate mirror pattern, the final texture coordinate, U, is calculated, according to the following:

$$U=U' \text{ for } I\%1=0, \text{ and}$$

$$U=\text{width}-U' \text{ for } I\%1=1,$$

In other words, the texture map is reversed, or mirrored, for alternating instances of the texture map in the array of texture maps across the surface area of the rendered object. Similar equations are implemented in the vertical direction, using the height of the texture map, instead of the width of the texture map.

Unfortunately, the implementation of the division operations—the remainder division operation to compute the intermediate texture coordinate, U', and the quotient division operation to compute the fixed point integer component, I—is computationally expansive. Additionally, this configuration is expensive to implement in hardware because of the surface area consumed to implement these division operations

SUMMARY OF THE INVENTION

Embodiments of a system are described. In one embodiment, the system is a graphic processing system to compute a texture coordinate. An embodiment of the graphic processing system includes a memory device, a texture coordinate generator, and a display device. The memory device is configured to store a plurality of texture maps. The texture coordinate generator is coupled to the memory device. The texture coordinate generator is configured to compute a final texture coordinate using an arithmetic operation exclusive of a division operation. The display device is coupled to the texture coordinate generator. The display device is configured to display a representation of one of the plurality of texture maps according to the final texture coordinate. Embodiments of the graphic processing system facilitate a simple hardware implementation using operations other than division. Other embodiments of the system are also described.

Embodiments of a method are also described. In one embodiment, the method is a method for computing a texture coordinate. An embodiment of the method includes identifying an integer component of a floating point texture coordinate, identifying a fraction component of the floating point texture coordinate, and computing an intermediate texture coordinate based on the fraction component of the floating point texture coordinate using an arithmetic operation other than a division operation. Other embodiments of the method are also described.

Other embodiments are also described. Other aspects and advantages of embodiments of the present invention will become apparent from the following detailed description, taken in conjunction with the accompanying drawings, illustrated by way of example of the principles of the invention.

BRIEF DESCRIPTION OF THE DRAWINGS

Throughout the description, similar reference numbers may be used to identify similar elements.

DETAILED DESCRIPTION

Figure 1:
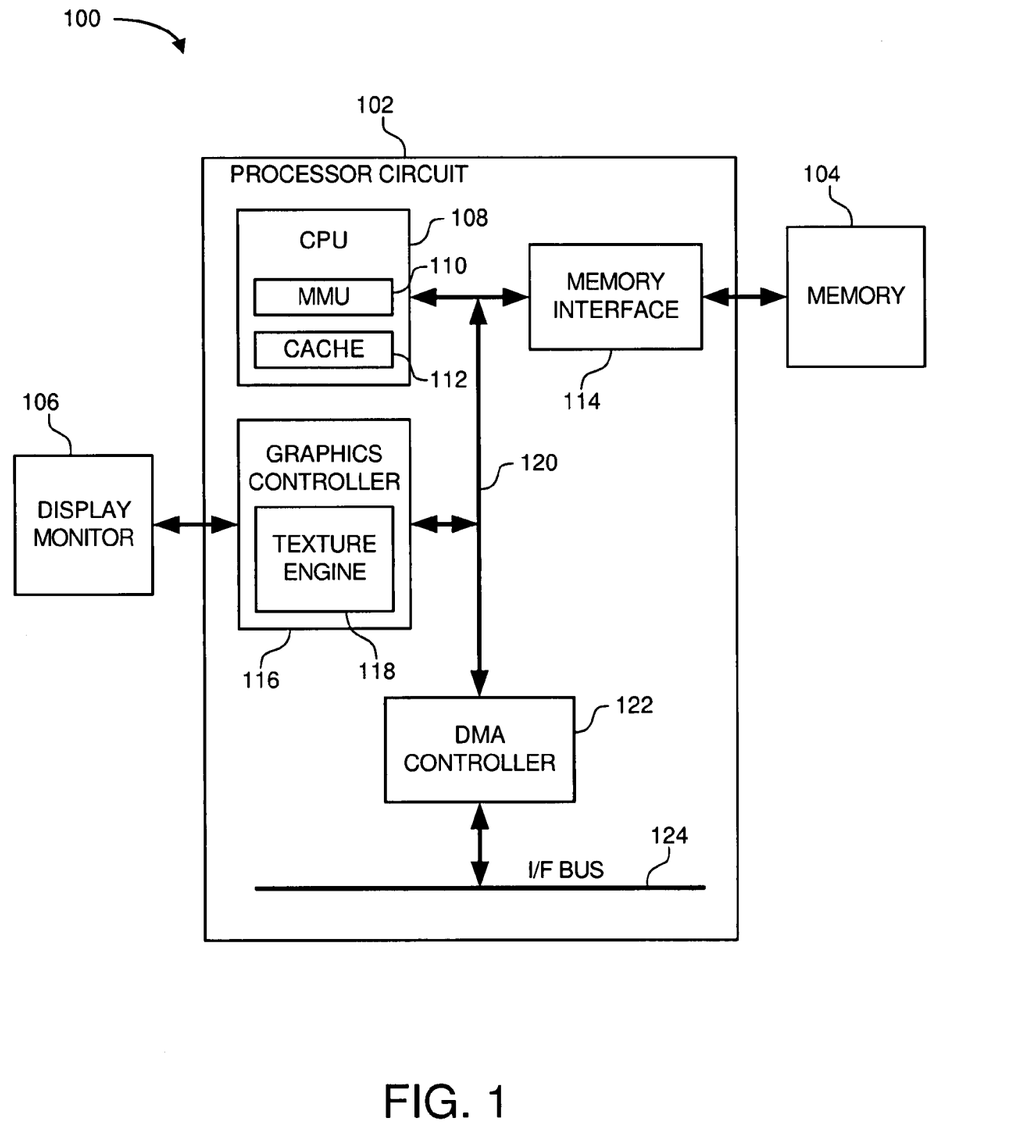
FIG. 1 depicts a schematic block diagram of one embodiment of a computer graphics system.

FIG. 1 depicts a schematic block diagram of one embodiment of a computer graphics system 100. The computer graphics system 100 may implement texture mapping and level of detail computations, as described below. As shown in FIG. 1, the computer graphics system 100 is a highly integrated system which includes an integrated processor circuit 102, a memory device 104, and a display monitor 106. In one embodiment, the memory device 104 includes read-only-memory (ROM) and random access memory (RAM). Other embodiments may include different types of memory devices. The highly integrated architecture allows power to be conserved. Other embodiments may include other components such as a peripheral controller (not shown).

The depicted integrated processor circuit 102 includes a processing unit (CPU) 108 which includes a memory management unit (MMU) 110 and one or more instruction and/or data caches 112. The integrated processor circuit 102 also includes a memory interface 114 to interface with the memory 104. The integrated processor circuit 102 also includes graphics controller 116 which includes a texture engine 118. In one embodiment, the texture engine 118 implements one or more texture operations related to the texture pipeline 130 shown in FIG. 3 and described in more detail below. In particular, the texture engine 118 may apply one or more texture maps to a graphical object. The texture engine 118 determines which texture map to apply based on a level of detail calculation. The graphics controller 116 is coupled to the processing unit 108 and the memory interface 114 by a bus 120.

A direct memory access (DMA) controller 122 is also coupled to the bus 120. The DMA controller 122 couples the bus 120 to an interface (I/F) bus 124 to which other core logic functional components (not shown) such as an encoder/decoder (CODEC) interface, a parallel interface, a serial interface, and an input device interface may be coupled. In one embodiment, the DMA controller 122 accesses data stored in the memory device 104 via the memory interface 114 and provides the data to peripheral devices connected to the I/F bus 124. The DMA controller 122 also sends data from the peripheral devices to the memory device 104 via the memory interface 114.

In one embodiment, the graphics controller 116 requests and accesses graphical data from the memory device 104 via the memory interface 114. The graphics controller 116 then processes the data, formats the processed data, and sends the formatted data to the display device 106. In some embodiments, the display device 106 may be a liquid crystal display (LCD), a cathode ray tube (CRT), or a television (TV) monitor. Other embodiments of the computer graphics system 100 may include more or less components and may be capable of implementing fewer or more operations.

Figure 2:
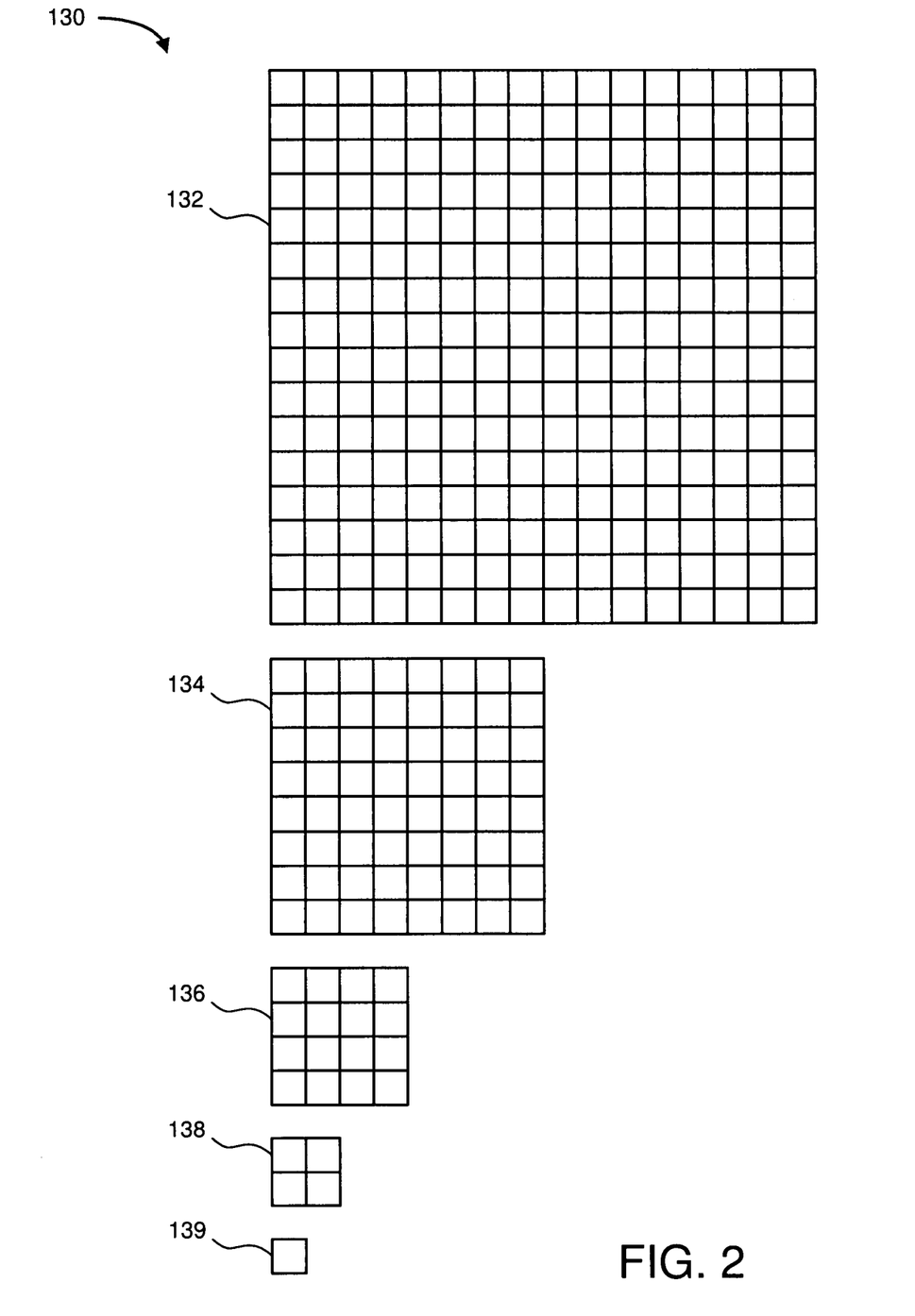
FIG. 2 depicts a schematic diagram of one embodiment of a plurality of texture maps corresponding to a plurality of levels of detail.

FIG. 2 depicts a schematic diagram of one embodiment of a plurality of texture maps 130 corresponding to a plurality of levels of detail. In particular, the plurality of texture maps 130 includes a high resolution texture map 132 including a 16×16 array of texels. The plurality of texture maps 130 also includes a low resolution texture map 139, which is a single texel. Between the high resolution texture map 132 and the low resolution texture map 139, there are several intermediate texture maps 134, 136, and 138 with varying resolutions. For example, the texture map 134 includes an 8×8 array of texels, the texture map 136 includes a 4×4 array of texels, and the texture map 138 includes a 2×2 array of texels.

Each of the plurality of texture maps 130 corresponds to a level of detail (LOD) because the detail of the texture representations vary among the plurality of texture maps 130. For example, the high resolution texture map 132 has more texture detail than the first intermediate texture map 134. Hence, the high resolution texture map 132 may be used to map very detailed textures to an object, or a part of an object, that is represented on the display device 106 as being close to the viewer. Similarly, the first intermediate texture map 134 has more texture detail than the second intermediate texture map 136, which has more texture detail than the third intermediate texture map 138, which has more texture detail than the low resolution texture map 139. Hence, the low resolution texture map 139 may be used to map low-detail textures to an object, or a part of an object, that is represented on the display device 106 as being far away from the viewer. Generating the plurality of texture maps 130 may be performed using various known texture map generation techniques, including compression, interpolation, filtering and so forth.

Since the high resolution texture map 132 represents the most detailed texture of the plurality of texture maps 130, the high resolution texture map 132 may be designated as "level 0." Similarly, the first intermediate texture map 134 may be designated as "level 1," the second intermediate texture map 136 may be designated as "level 2," the third intermediate texture map 138 may be designated as "level 3," and the low resolution texture map 139 may be designated as "level 4." Additionally, various values from the level of detail computation may correspond to each of the levels, or texture maps. In this way, the level of detail computation can be used to select one of the plurality of texture maps 130 to be used to texture an object, or a part of an object, represented on the display device 106.

Figure 3A:
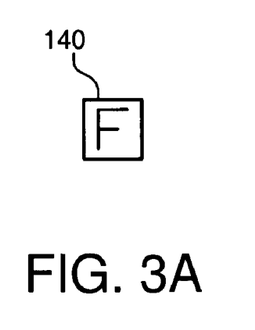
FIG. 3A depicts a schematic diagram of one embodiment of a texture map.

FIG. 3A depicts a schematic diagram of one embodiment of a texture map 140. The texture map 140 may represent any level of detail. The texture of the texture map is indicated with the letter "F" so that the orientation of the texture map 140 in different texture mapping patterns such as a texture mirror pattern can be visualized and described herein. However, embodiments of the texture map 140 may implement any type of texture, including symmetrical and asymmetrical textures.

Figure 3B:
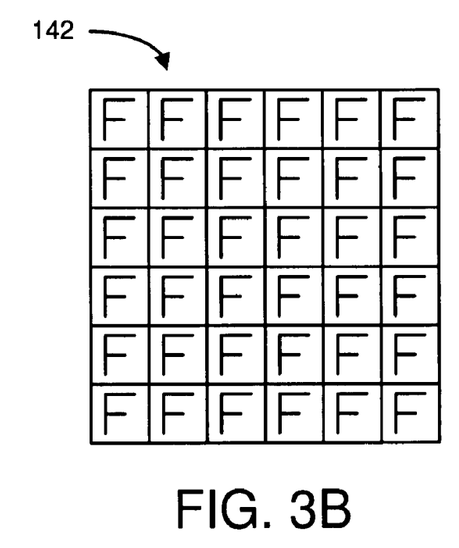
FIG. 3B depicts a schematic diagram of one embodiment of a texture wrapping pattern.

FIG. 3B depicts a schematic diagram of one embodiment of a texture wrapping pattern 142. The illustrated texture wrapping pattern 142 shows how the texture map 140 is arrayed across the surface area of a rendered object, with each instance of the texture map 140 oriented in substantially the same way. Although the rendered object is depicted as a square shape, other embodiments of the rendered object and, hence, the texture wrapping pattern 142 may be other shapes. Additionally, the individual texture maps 140 may be applied at other angles or orientations.

Figure 3C:
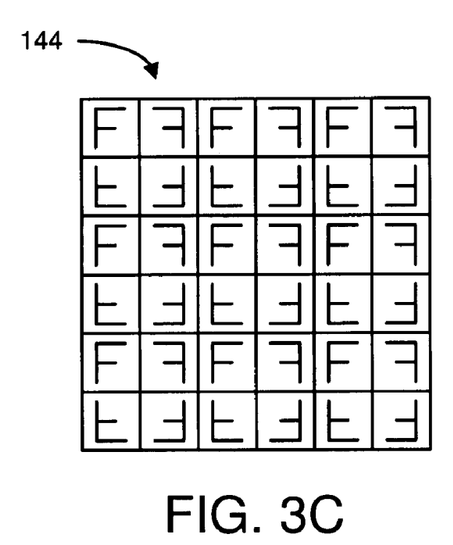
FIG. 3C depicts a schematic diagram of one embodiment of a texture mirror pattern.

FIG. 3C depicts a schematic diagram of one embodiment of a texture mirror pattern 144. The illustrated texture mirror pattern 144 shows how the texture map 140 is arrayed across the surface area of the rendered object, with alternating instances of the texture map 140 oriented in an opposing, or mirrored, way. The depicted texture mirror pattern 144 implements texture mirroring in both the vertical and horizontal directions, throughout the entire surface area of the rendered object.

Figure 3D:
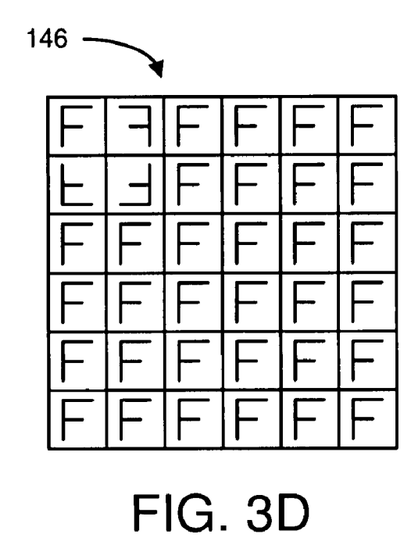
FIG. 3D depicts a schematic diagram of one embodiment of a texture mirror pattern with a single mirror instance.

Other embodiments may implement variations of the texture mirror pattern 144. For example, FIG. 3D depicts a schematic diagram of one embodiment of a texture mirror pattern 146 with a single mirror instance. This texture mirror pattern 146 also may be referred to as a texture mirror once pattern. In particular, only a single instance of each orientation of the mirrored texture map 140 is generated for the rendered object. In the depicted embodiment, the mirrored texture maps 140 are located in the upper left corner, however other embodiments may implement the single mirror instance in another location of the rendered object.

Figure 4:
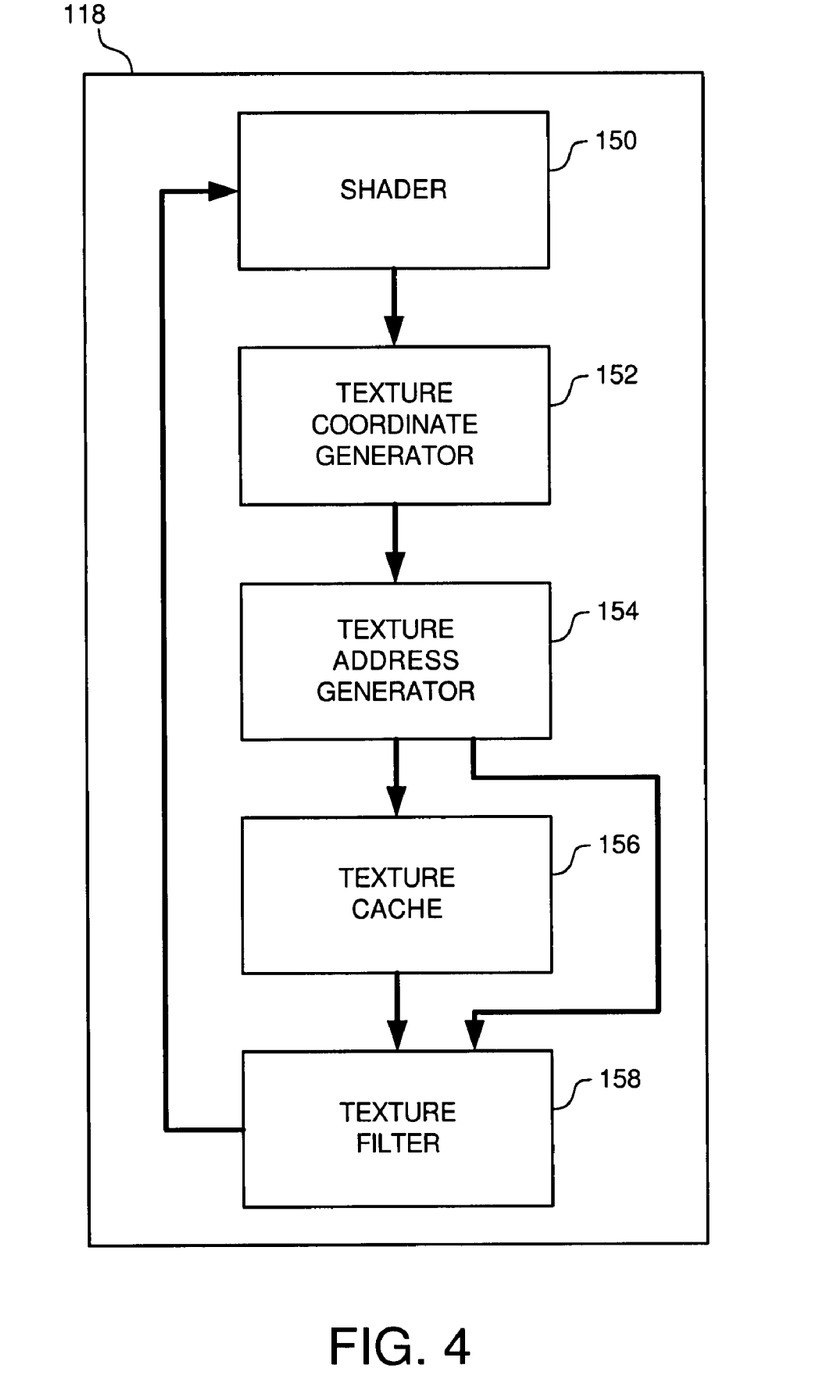
FIG. 4 depicts a schematic block diagram of one embodiment of a texture mapping pipeline for implementation in the texture engine.

FIG. 4 depicts a schematic block diagram of one embodiment of a texture mapping pipeline for implementation in the texture engine 118. The illustrated texture mapping pipeline includes a shader 150, a texture coordinate generator 152, a texture address generator 154, a texture cache 156, and a texture filter 158. However, other embodiments of the texture mapping pipeline may be implemented in other embodiments of the texture engine 118. Additionally, some of the stages described herein may be at least partially implemented by other components of the graphics controller 116.

In one embodiment, the shader 150 receives vertex coordinates corresponding to an object to be rendered on the display device 106. The texture coordinate generator 152 then generates texture coordinates corresponding to the locations of each of the texture maps 140 in a texture mapping pattern. In one embodiment, the texture coordinate generator 152 also implements a level of detail computation. An exemplary embodiment of the texture coordinate generator 152 is shown in FIG. 5 and described in more detail below.

The texture address generator 154 then determines the memory address of the texture map corresponding to the level of detail computation. The texture address generator 154 sends the texture map address to the texture cache 156, which determines if the requested texture map is stored in the cache or in another memory device. If the texture map is stored in another memory device, then the texture cache 156 retrieves the requested data from the memory device and stores it in the texture cache 156. The texture cache 156 then provides a copy of the requested texture map to the texture filter 158.

The texture filter 158 correlates the texels of the texture map to each of the corresponding pixels of the display device 106. In some embodiments, there is a one-to-one correlation between the texels and the pixels with respect to size and location. Alternatively, there may be a one-to-one correlation between the texels and the pixels with respect to size, but the texture filter 158 nevertheless performs texture filtering because the locations of the texels do not align with the locations of the pixels. In other embodiments, the texel sizes are different from the pixel sizes, so the texture filter 158 implements magnification or minification to correlate the texels of the requested texture map to the pixels of the display device 106. Other embodiments of the texture filter 158 may implement other types of texture filtering.

Figure 5:
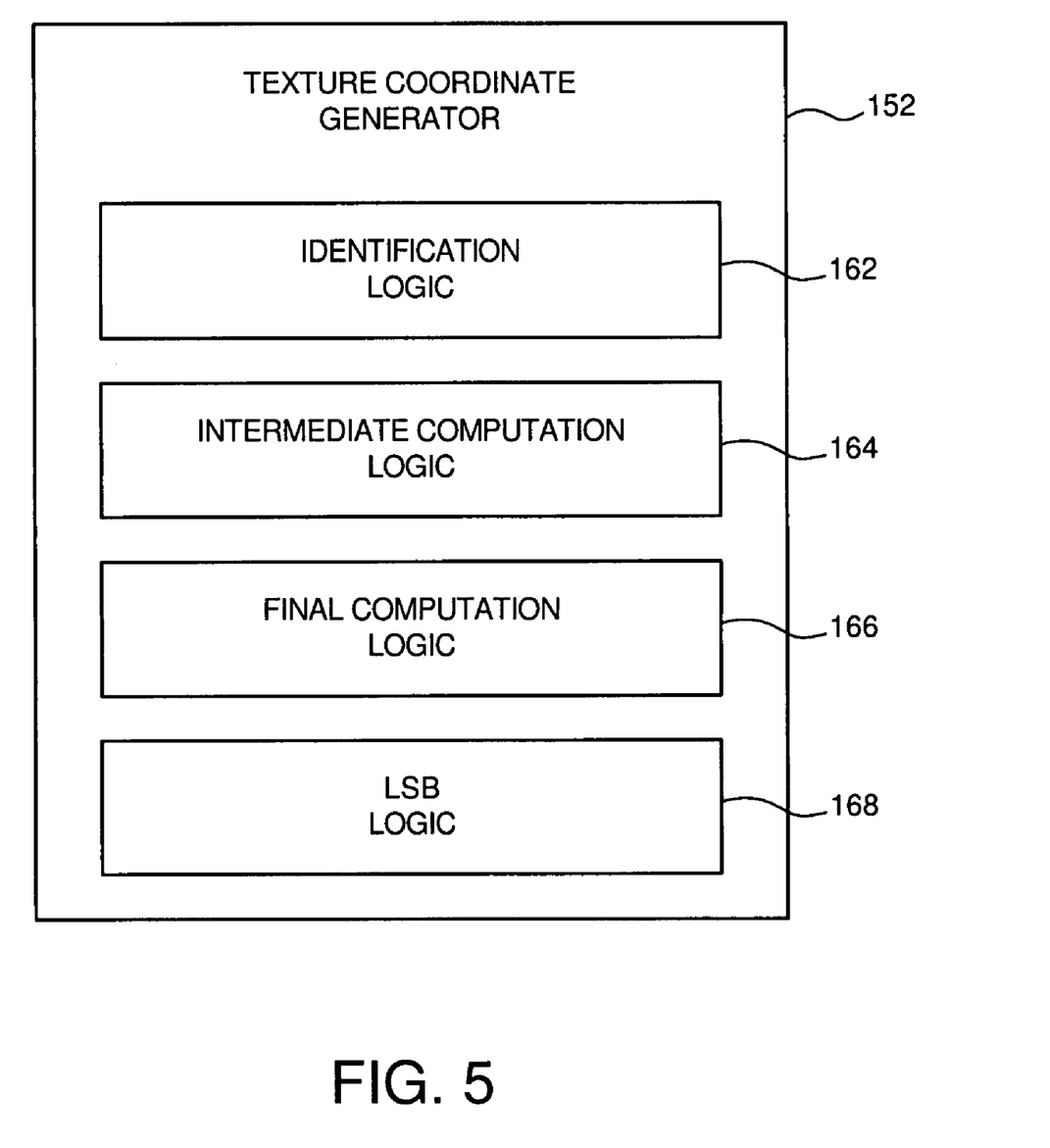
FIG. 5 depicts a schematic block diagram of one embodiment of the texture coordinate generator of the texture mapping pipeline of FIG. 4.

FIG. 5 depicts a schematic block diagram of one embodiment of the texture coordinate generator 152 of the texture mapping pipeline of FIG. 4. The illustrated texture coordinate generator 152 includes identification logic 162, intermediate computation logic 164, final computation logic 166, and least significant bit (LSB) logic 168. Other embodiments of the texture coordinate generator 152 may implement fewer or more logic components.

In general, the texture coordinate generator 152 generates a texture coordinate for each instance of the texture map 140 in a texture mapping pattern such as the texture wrapping pattern 142 and the texture mirror pattern 144. In some embodiments, the computations involved in generating at least some of the texture coordinates depend on the type of texture mapping pattern implemented.

In one embodiment, the identification logic 162 is configured to identify an integer component, $S_i$, and a fraction component, $S_f$, of a floating point texture coordinate, S. In order to identify the integer component, $S_i$, the identification logic 162 implements the following:

$$S_i = \text{float}(\text{int}(S))$$

In order to identify the fraction component, $S_f$, the identification logic 162 implements the following:

$$S_f = \text{float}(\text{frac}(S))$$

It should be noted that these implementations do not use division operations. In particular, these implementations do not use quotient or remainder division operations. Hence, implementing the identification logic 162 in hardware may be less complicated than implementing conventional texture mapping components which use division operations. Other embodiments use other implementions of the identification logic 162 to identify the integer and faction components of the floating point texture coordinate.

In one embodiment, the intermediate computation logic 164 is configured to convert the integer component, $S_i$, of the floating point texture coordinate, S, to a fixed point integer component, I, according to the following:

$$I = \text{int}(S_i)$$

Similarly, the intermediate computation logic 164 is configured to compute an intermediate texture coordinate, U', based on the fraction component, $S_f$, of the floating point texture coordinate, S. In one embodiment, the intermediate computation logic 146 computes the intermediate texture coordinate, U', according to the following:

$$U' = \text{int}(S_f \times \text{width})$$

The width variable designates a dimension of one of the texture maps 140. However, in other embodiments, similar operations are implemented using a height dimension of one of the texture map 140. In alternative embodiments, the intermediate computation logic 164 uses other implementations to compute the fixed point integer component, I, and the intermediate texture coordinate, U'.

In one embodiment, the final computation logic 166 is configured to compute a final texture coordinate, U. The computation of the final texture coordinate, U, may depend on the type of texture mapping pattern implemented. For example, the fraction component, $S_f$, of the floating point texture coordinate, S, may be multiplied by the appropriate texture size, or dimension (e.g., the width variable), for the texture wrapping pattern 142. In one embodiment, the final computation logic 166 is configured to compute the final texture coordinate, U, equal to the intermediate texture coordinate, U', for a texture wrapping operation, according to the following:

$$U = U'$$

In this way, all of the texture maps 140 are oriented in the same way for the texture wrapping pattern 142.

In contrast, the instances of the texture map 140 in the texture mirror pattern 144 are not all oriented in the same way. In one embodiment, the orientation or each texture map 140 in the texture mirror patter 144 depends on the least significant (LSB) bit of the fixed point integer component, I. Since the LSB of the fixed point integer component, I, alternates between logical low (i.e., a logical "0") and logical high (i.e., a logical "1") states as it increases (either in the horizontal or the vertical direction), the final computation logic 166 may implement different operations depending on the value of the LSB. In one embodiment, the final computation logic 166 is configured to compute the final texture coordinate, U, for a texture mirroring operation, according to the following:

$$U = U' \text{ for LSB} = 0, \text{ and}$$

$$U = \text{width} - U' \text{ for LSB} = 1$$

In another embodiment, if the LSB of the fixed point integer component, I, is logical "0," then the fraction component, $S_f$, of the floating point texture coordinate, S, is multiplied by the texture size, or dimension (e.g., the width variable), to produce a value to address the texture. Alternatively, if the LSB of the fixed point integer component, I, is a logical "1," then the term $(1-S_f)$ is multiplied by the texture size, or dimension (e.g., the width variable), to produce a value to address the texture.

In one embodiment, the LSB logic 168 is configured to identify the value of the LSB of the fixed point integer component, I. As described above, the fixed point integer component, I, is based on the integer component, $S_i$, of the floating point texture coordinate, S.

In one embodiment, using the above components to compute the final texture coordinate facilitates performing the texture coordinate computation without using any division operations such as quotient, remainder, or other division operations. Therefore, the hardware may be computationally less expansive, which reduces overall cost of the design.

Figure 6:
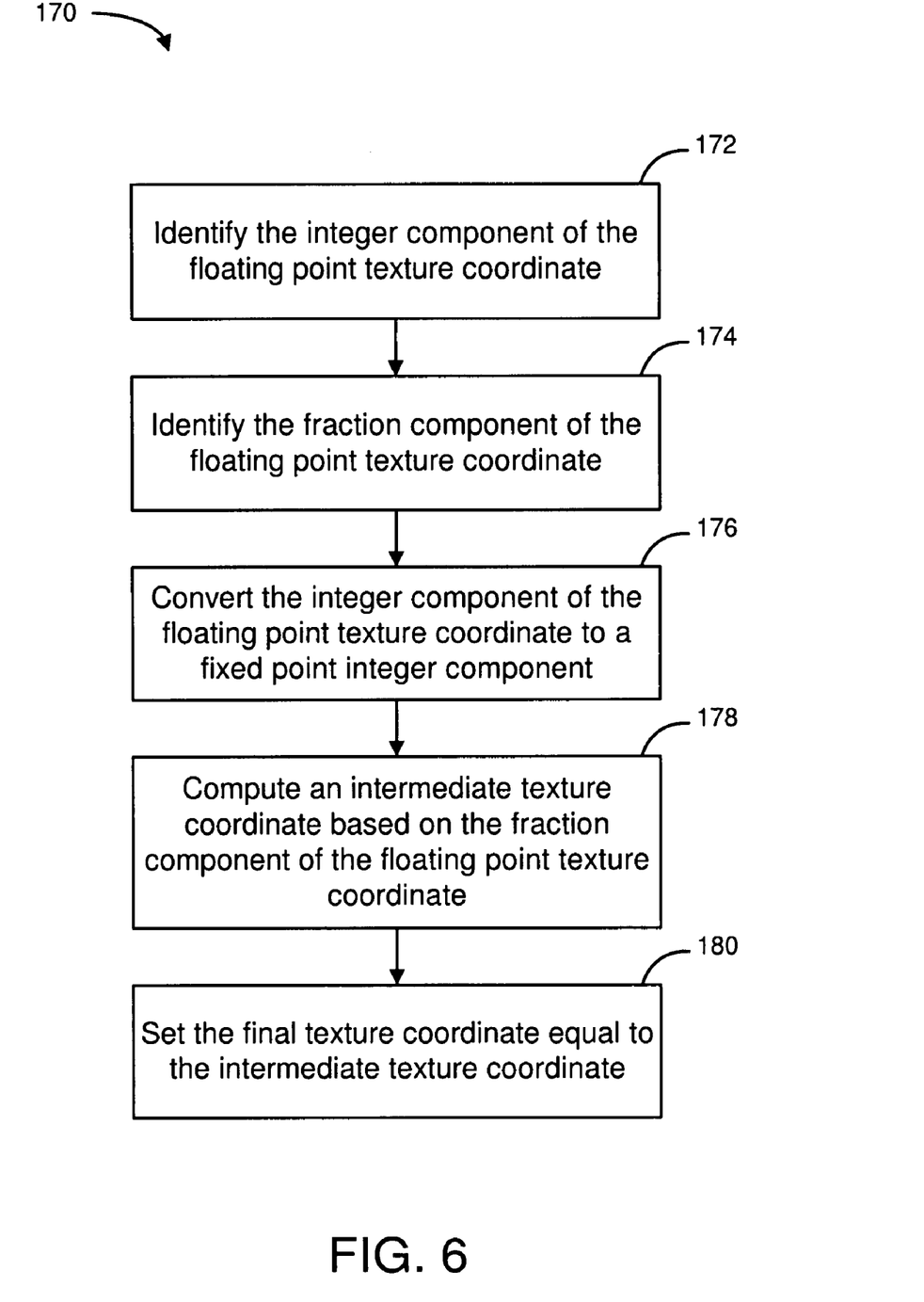
FIG. 6 depicts a schematic flow chart diagram of one embodiment of a texture coordinate generation method for a texture wrapping operation.

FIG. 6 depicts a schematic flow chart diagram of one embodiment of a texture coordinate generation method 170 for a texture wrapping operation. Although some embodiments of the texture coordinate generation method 170 may be implemented in conjunction with the texture coordinate generator 152 of FIG. 5, other embodiments may be implemented in conjunction with other texture coordinate generators.

In the depicted texture coordinate generation method 170, the identification logic 162 identifies 172 the integer component, $S_i$, of the floating point texture coordinate, S. The identification logic 162 also identifies 174 the fraction component, $S_f$, of the floating point texture coordinate, S. The intermediate computation logic 164 then converts 176 the integer component, $S_i$, of the floating point texture coordinate, S, to a fixed point integer component, I, as described above. The intermediate computation logic 164 also computes 178 an intermediate texture coordinate, U', based on the fraction component, $S_f$, of the floating point texture coordinate, S. The final computation logic 166 then sets 180 the final texture coordinate, U, equal to the intermediate texture coordinate, U'. The depicted texture coordinate generation method 170 then ends. In one embodiment, the texture coordinate generation method 170 may be implemented for each instance of the texture map 140 in a texture mapping pattern.

Figure 7:
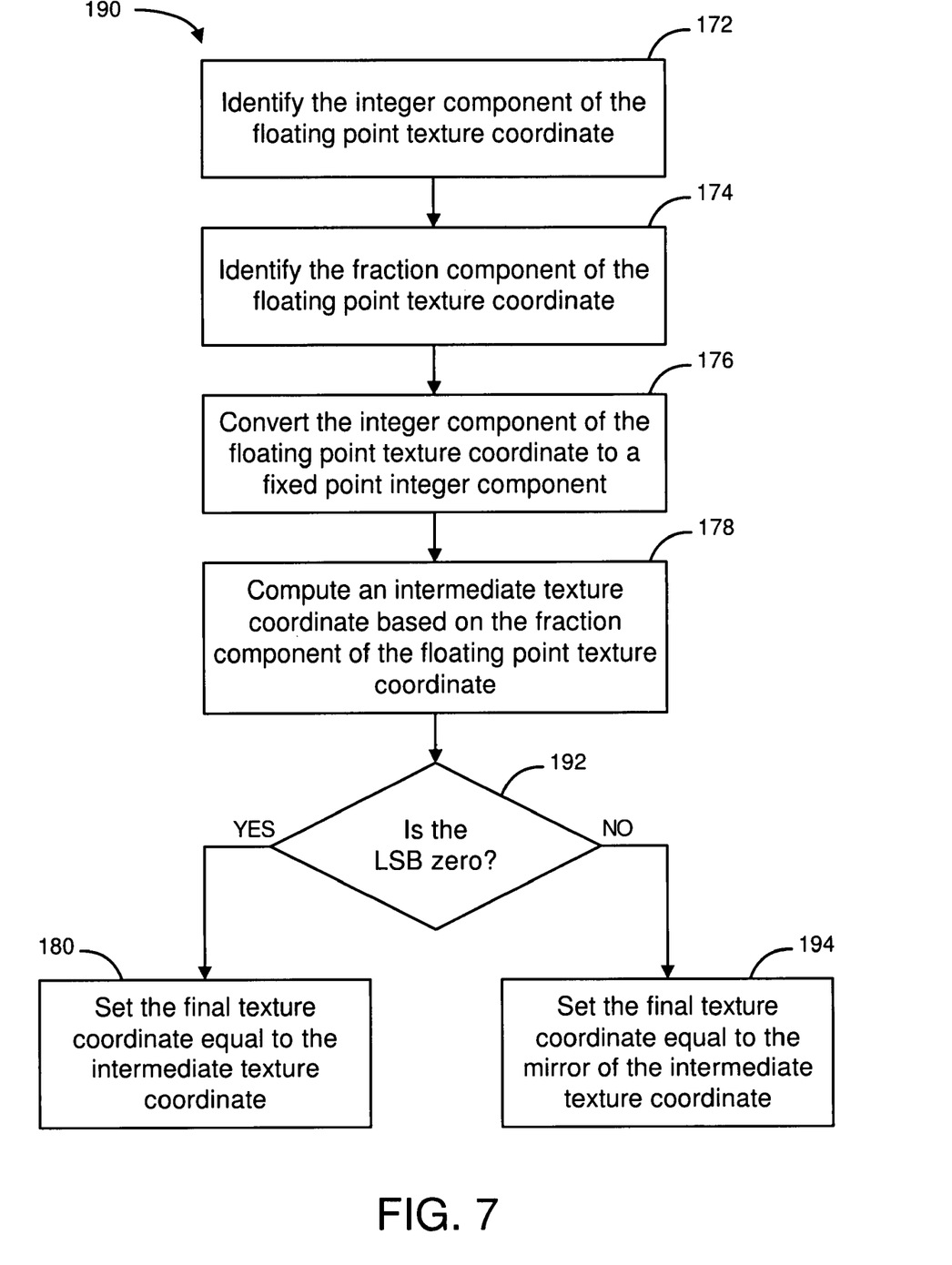
FIG. 7 depicts a schematic flow chart diagram of another embodiment of a texture coordinate generation method for a texture mirror operation.

FIG. 7 depicts a schematic flow chart diagram of another embodiment of a texture coordinate generation method 190 for a texture mirror operation. Although some embodiments of the texture coordinate generation method 190 may be implemented in conjunction with the texture coordinate generator 152 of FIG. 5, other embodiments may be implemented in conjunction with other texture coordinate generators. For convenience, some of the operations shown in FIG. 7 are the same as operations shown in FIG. 6, and are described above.

After the intermediate computation logic 164 computes 178 the intermediate texture coordinate, U', the LSB logic 168 determines 192 if the LSB of the fixed point integer component, I, is a logical "0" or a logical "1." If the LSB of the fixed point integer component, I, is a logical "0," then the final computation logic 166 then sets 180 the final texture coordinate, U, equal to the intermediate texture coordinate, U', as described above. Otherwise, if the LSB of the fixed point integer component, I, is a logical "1," then the final computation logic 166 then sets 194 the final texture coordinate, U, equal to the mirror of the intermediate texture coordinate, U', as described above. The depicted texture coordinate generation method 190 then ends. In one embodiment, the texture coordinate generation method 190 may be implemented for each instance of the texture map 140 in a texture mapping pattern.

It should be noted that embodiments of the level of texture coordinate generation methods 170 and 190 may be implemented in software, firmware, hardware, or some combination thereof. Additionally, some embodiments of the texture coordinate generation methods 170 and 190 may be implemented using a hardware or software representation of one or more algorithms related to the operations described above. For example, software, hardware, or a combination of software and hardware may be implemented to compute one or more of the various terms or components described above.

Embodiments of the invention also may involve a number of functions to be performed by a computer processor such as a central processing unit (CPU), a graphics processing unit (GPU), or a microprocessor. The microprocessor may be a specialized or dedicated microprocessor that is configured to perform particular tasks by executing machine-readable software code that defines the particular tasks. The microprocessor also may be configured to operate and communicate with other devices such as direct memory access modules, memory storage devices, Internet related hardware, and other devices that relate to the transmission of data. The software code may be configured using software formats such as Java, C++, XML (Extensible Mark-up Language) and other languages that may be used to define functions that relate to operations of devices required to carry out the functional operations related described herein. The code may be written in different forms and styles, many of which are known to those skilled in the art. Different code formats, code configurations, styles and forms of software programs and other means of configuring code to define the operations of a microprocessor may be implemented.

Within the different types of computers, such as computer servers, that utilize the invention, there exist different types of memory devices for storing and retrieving information while performing some or all of the functions described herein. In some embodiments, the memory/storage device where data is stored may be a separate device that is external to the processor, or may be configured in a monolithic device, where the memory or storage device is located on the same integrated circuit, such as components connected on a single substrate. Cache memory devices are often included in computers for use by the CPU or GPU as a convenient storage location for information that is frequently stored and retrieved. Similarly, a persistent memory is also frequently used with such computers for maintaining information that is frequently retrieved by a central processing unit, but that is not often altered within the persistent memory, unlike the cache memory. Main memory is also usually included for storing and retrieving larger amounts of information such as data and software applications configured to perform certain functions when executed by the central processing unit. These memory devices may be configured as random access memory (RAM), static random access memory (SRAM), dynamic random access memory (DRAM), flash memory, and other memory storage devices that may be accessed by a central processing unit to store and retrieve information. Embodiments may be implemented with various memory and storage devices, as well as any commonly used protocol for storing and retrieving information to and from these memory devices respectively.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A graphic processing system including a processor configured to execute software code stored in non-transitive electronic storage to compute a texture coordinate, the graphic processing system comprising:
    a memory device to store a plurality of texture maps;
    a texture coordinate generator coupled to the memory device, wherein the texture coordinate generator includes:
    a processor configured to compute a final texture coordinate using an arithmetic operation exclusive of a division operation; and
    an identification logic, wherein the identification logic identifies an integer component and a fraction component of a floating point texture coordinate; and
    wherein the identification logic further configured to identify the integer component of the floating point texture coordinate, according to the following:

$S_i$=float(int($S$)), where S designates the floating point texture coordinate, and St designates the integer component of the floating point texture coordinate;
    wherein the processor is configured to compute an intermediate texture coordinate based on the fraction component and to set the final texture component equal to the intermediate texture coordinate; and
    a display device coupled to the texture coordinate generator, the display device to display a representation of one of the plurality of texture maps according to the final texture coordinate.

2. The graphic processing system of claim 1, the texture coordinate generator further comprising intermediate computation logic, the intermediate computation logic to convert the integer component of the floating point texture coordinate to a fixed point integer component, according to the following:

$I$=int($S_i$), where I designates the fixed point integer component.

3. The graphic processing system of claim 2, the texture coordinate generator further comprising final computation logic, the final computation logic to compute the final texture coordinate equal to the intermediate texture coordinate for a texture wrapping operation, according to the following:

$U=U'$, where U designates the final texture coordinate.

4. The graphic processing system of claim 2, the texture coordinate generator further comprising LSB logic, the LSB logic to identify a value of a least significant bit of a fixed point integer component, the fixed point integer component based on the integer component of the floating point texture coordinate.

5. The graphic processing system of claim 4, the texture coordinate generator further comprising final computation logic, the final computation logic to compute the final texture coordinate for a texture mirroring operation, according to the following:

$U=U'$ for LSB=0, and $U$=width−$U'$ for LSB=1, where U designates the final texture coordinate, and LSB designates the value of the least significant bit of the fixed point integer component.

6. A graphic processing system including a processor configured to execute software code stored in non-transitive electronic storage to compute a texture coordinate, the graphic processing system comprising:
    a memory device to store a plurality of texture maps;
    a texture coordinate generator coupled to the memory device, wherein the texture coordinate generator includes:
    a processor configured to compute a final texture coordinate using an arithmetic operation exclusive of a division operation; and
    an identification logic, wherein the identification logic identifies an integer component and a fraction component of a floating point texture coordinate; and
    the identification logic further configured to identify the fraction component of the floating point texture coordinate, according to the following:

$S_f$=float(frac($S$)), where S designates the floating point texture coordinate, and $S_f$ designates the fraction component of the floating point texture coordinate; and
    a display device coupled to the texture coordinate generator, the display device to display a representation of one of the plurality of texture maps according to the final texture coordinate.

7. The graphic processing system of claim 6, the texture coordinate generator further comprising intermediate computation logic, the intermediate computation logic to compute an intermediate texture coordinate, according to the following:

$U'$=int($S_f$×width), where U' designates the intermediate texture coordinate, and width designates a dimension of one of the plurality of texture maps.

8. A method for computing a texture coordinate by a system comprising a processor and software code stored in non-transitive storage, the method comprising:
    identifying, using a texture coordinate generator, an integer component of a floating point texture coordinate;
    identifying, using the texture coordinate generator, a fraction component of the floating point texture coordinate;
    computing, using the texture coordinate generator, an intermediate texture coordinate based on the fraction component of the floating point texture coordinate using an arithmetic operation other than a division operation; and
    identifying the integer component and the fraction component of the floating point texture coordinate, according to the following:

$S_i$=float(int($S$)), and $S_f$=float(frac($S$)), where S designates the floating point texture coordinate, $S_i$ designates the integer component of the floating point texture coordinate, and $S_f$ designates the fraction component of the floating point texture coordinate.

9. A method for computing a texture coordinate by a system comprising a processor and software code stored in non-transitive storage, the method comprising:
- identifying, using a texture coordinate generator, an integer component of a floating point texture coordinate;
- identifying, using the texture coordinate generator, a fraction component of the floating point texture coordinate;
- computing, using the texture coordinate generator, an intermediate texture coordinate based on the fraction component of the floating point texture coordinate using an arithmetic operation other than a division operation; and
- computing the intermediate texture coordinate, according to the following:

$$U'=\text{int}(S_f \times \text{width}),$$

where U' designates the intermediate texture coordinate, $S_f$ designates the fraction component of the floating point texture coordinate, and width designates a dimension of a texture map.

10. A method for computing a texture coordinate by a system comprising a processor and software code stored in non-transitive storage, the method comprising:
- identifying, using a texture coordinate generator, an integer component of a floating point texture coordinate;
- identifying, using the texture coordinate generator, a fraction component of the floating point texture coordinate;
- computing, using the texture coordinate generator, an intermediate texture coordinate based on the fraction component of the floating point texture coordinate using an arithmetic operation other than a division operation;
- computing a final texture coordinate based on the intermediate texture coordinate; and
- converting the integer component of the floating point texture coordinate to the fixed point integer component, according to the following:

$$I=\text{int}(S_i),$$

where I designates a fixed point integer component, and $S_i$ designates the integer component of the floating point texture coordinate.

11. The method of claim 10, computing the final texture coordinate in response to a determination of a value of a least significant bit of the fixed point integer component for a texture mirroring operation, according to the following:

$$U=U' \text{ for LSB}=0, \text{ and}$$

$$U=\text{width}-U' \text{ for LSB}=1,$$

where U designates the final texture coordinate, U' designates the intermediate texture coordinate, width designates a dimension of a texture map, and LSB designates the value of the least significant bit of the fixed point integer component.

12. A non-transitory computer-readable storage medium embodying a program of machine-readable instructions, executable by a digital processor, to perform operations to facilitate computation of a texture coordinate, the operations comprising:
- identifying an integer component of a floating point texture coordinate;
- identifying a fraction component of the floating point texture coordinate;
- computing an intermediate texture coordinate based on a fixed point fraction of the floating point texture coordinate component using an arithmetic operation other than a division operation;
- converting the integer component of the floating point texture coordinate to a fixed point integer component, according to the following:

$$I=\text{int}(S_i),$$

where I designates the fixed point integer component, and Si designates the integer component of the floating point texture coordinate;
- identifying a value of a least significant bit of the fixed point integer component; and
- computing a final texture coordinate for a texture mirroring operation, according to the following:

$$U=U' \text{ for LSB}=0, \text{ and}$$

$$U=\text{width}-U' \text{ for LSB}=1,$$

where U designates the final texture coordinate, and LSB designates the value of the least significant bit of the fixed point integer component.

13. An apparatus having a processor configured to execute code stored in non-transitive storage and for computing a texture coordinate, the apparatus comprising:
- means for identifying an integer component of a floating point texture coordinate;
- means for identifying a fraction component of the floating point texture coordinate;
- means for computing an intermediate texture coordinate based on the fraction component of the floating point texture coordinate using an arithmetic operation other than a division operation;
- means for converting the integer component of the floating point texture coordinate to a fixed point integer component, according to the following:

$$I=\text{int}(S_i),$$

where I designates the fixed point integer component, and $S_i$ designates the integer component of the floating point texture coordinate;
- means for identifying a value of a least significant bit of the fixed point integer component; and
- means for computing a final texture coordinate for a texture mirroring operation, according to the following:

$$U=U' \text{ for LSB}=0, \text{ and}$$

$$U=\text{width}-U' \text{ for LSB}=1,$$

where U designates the final texture coordinate, and LSB designates the value of the least significant bit of the fixed point integer component.

* * * * *